United States Patent
Avins (10) Patent No.: US 9,080,635 B2
(45) Date of Patent: Jul. 14, 2015

(54) HARDENED TURBINE PLATE

(75) Inventor: David C. Avins, Burbank, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 611 days.

(21) Appl. No.: 13/441,509

(22) Filed: Apr. 6, 2012

(65) Prior Publication Data

US 2012/0266589 A1 Oct. 25, 2012

Related U.S. Application Data (60) Provisional application No. 61/476,847, filed on Apr. 19, 2011.

(51) Int. Cl.
*F16H 41/24* (2006.01)
*F16F 15/12* (2006.01)
*F16H 45/02* (2006.01)

(52) U.S. Cl.
CPC ............ *F16F 15/1207* (2013.01); *F16H 41/24* (2013.01); *F16H 2045/021* (2013.01); *F16H 2045/0205* (2013.01); *F16H 2045/0226* (2013.01); *F16H 2045/0278* (2013.01); *F16H 2045/0294* (2013.01)

(58) Field of Classification Search
CPC .................... F16F 15/1207; F16H 2045/0205; F16H 2045/021; F16H 2045/0226; F16H 2045/0278; F16H 2045/0294; F16H 41/24

USPC ............................................ 60/330, 338, 361
See application file for complete search history.

(56) References Cited

U.S. PATENT DOCUMENTS

| | | | |
|---|---|---|---|
| 6,044,946 A * | 4/2000 | Makino et al. .................. | 60/361 |
| 6,142,272 A | 11/2000 | Meisner et al. | |
| 7,401,688 B2 * | 7/2008 | Fukunaga et al. .............. | 60/338 |
| 8,607,556 B2 * | 12/2013 | Graf ................................ | 60/338 |

* cited by examiner

*Primary Examiner* — Thomas E Lazo
(74) *Attorney, Agent, or Firm* — Simpson & Simpson, PLLC (57) ABSTRACT

A torque converter, including: a damper assembly including a cover plate including a first plurality of openings, a flange, and at least one spring in contact with the flange and the cover plate; a turbine including at least one first blade and a shell including a portion disposed radially inward of the at least one blade, and a second plurality of openings in the portion; a turbine plate with a third plurality of openings; and a plurality of fasteners passing through the first, second, and third pluralities of openings. The plurality of fasteners: fixedly secure the cover plate, the portion of the turbine shell, and the turbine plate to one another; or fixed securing the portion of the turbine shell to the turbine plate and restricting rotation of the cover plate with respect to the portion of the turbine shell to the turbine plate.

18 Claims, 7 Drawing Sheets

HARDENED TURBINE PLATE

CROSS-REFERENCE TO RELATED APPLICATIONS

This application claims the benefit under 35 U.S.C. §119 (e) of U.S. Provisional Application No. 61/476,847 filed Apr. 19, 2011, which application is incorporated herein by reference.

TECHNICAL FIELD

The present disclosure relates to an assembly for a torque converter that links a turbine to a damper assembly and eliminates a turbine hub. Specifically, a hardened plate links the turbine and the damper assembly and provides a surface to receive a thrust bearing.

BACKGROUND

Commonly owned U.S. Pat. No. 6,142,272 discloses a torque converter including a plate welded to a turbine shell and connected to cover plates for a damper assembly. A thrust bearing is located between the plate and a stator. The patent also discloses a turbine hub to which the damper assembly is connected. The turbine hub receives torque from the turbine or the damper assembly and transmits the torque to an input shaft for a transmission.

SUMMARY

According to aspects illustrated herein, there is provided an assembly for a torque converter, including: a damper assembly including a cover plate including a first plurality of openings, a flange, and at least one spring in contact with the flange and the cover plate; a turbine including at least one first blade and a shell including a portion disposed radially inward of the at least one blade, and a second plurality of openings in the portion; a turbine plate with a third plurality of openings; and a plurality of fasteners passing through the first, second, and third pluralities of openings. The plurality of fasteners: fixedly secure the cover plate, the portion of the turbine shell, and the turbine plate to one another; or fixed securing the portion of the turbine shell to the turbine plate and restricting rotation of the cover plate with respect to the portion of the turbine shell to the turbine plate.

According to aspects illustrated herein, there is provided a torque converter, including: a turbine including at least one first blade and a shell including a portion disposed radially inward of the at least one blade, and a first plurality of openings in the portion; an impeller with at least one second blade; a stator with at least one third blade, the stator axially disposed between to the turbine and the impeller; a damper assembly including a cover plate including a second plurality of openings, a flange, and at least one spring in contact with the flange and the cover plate; and a turbine plate assembly including: a turbine plate with a third plurality of openings; a plurality of fasteners passing through the first, second, and third pluralities of openings and fixedly securing the portion of the turbine shell to the turbine plate; and a resilient element in contact with the plurality of fasteners and the cover plate and urging the cover plate toward the turbine plate. The torque converter includes a bearing axially disposed between the turbine plate and the stator and in contact with the turbine plate and the stator to enable relative rotation of the turbine shell with respect to the stator. A radially inner circumference of the turbine plate is in contact with the flange to radially center the turbine with respect to the flange. Torque from the turbine is transmitted from the portion of the turbine shell to the cover plate through the plurality of fasteners and from the cover plate to the flange of the damper through the at least one spring. The portion of the turbine shell and a radially outward portion of the turbine plate are aligned in an axial direction. For each fastener in the plurality of fasteners, a first portion of said each fastener passing through the cover plate has a first diameter. Each opening in the first plurality of openings has a radial extent and a circumferential extent each greater than the diameter such that relative rotation of the cover plate and the plurality of fasteners is enabled.

According to aspects illustrated herein, there is provided a torque converter, including: a turbine including at least one first blade and a shell including a portion disposed radially inward of the at least one blade, and a first plurality of openings in the portion; an impeller with at least one second blade; a stator with at least one third blade, the stator connected to the turbine and the impeller; a damper assembly including a cover plate including a second plurality of openings, a flange, and at least one spring in contact with the flange and the cover plate; and a turbine plate assembly including: a turbine plate with a third plurality of openings; and a plurality of fasteners passing through the first, second, and third pluralities of openings and fixedly securing the portion of the turbine shell to the turbine plate. The torque converter includes a bearing axially disposed between the turbine plate and the stator and in contact with the turbine plate and the stator to enable relative rotation of the turbine shell with respect to the stator. Torque from the turbine is transmitted from the portion of the turbine shell to the cover plate through the plurality of fasteners and from the cover plate to the flange of the damper through the at least one spring. The portion of the turbine shell and a radially outward portion of the turbine plate are aligned in a radial direction. A radially inner circumference of the turbine plate is in contact with the flange to radially center the turbine with respect to the flange; or the turbine plate assembly includes a seal element sealed against a radially inner circumference of the turbine plate and arranged to seal against an input shaft for a transmission.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
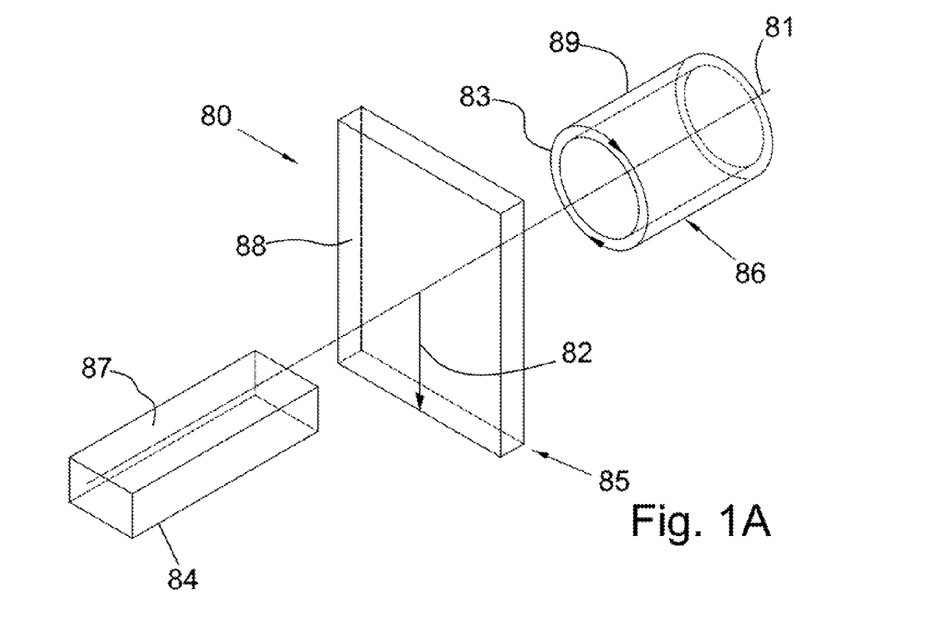
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
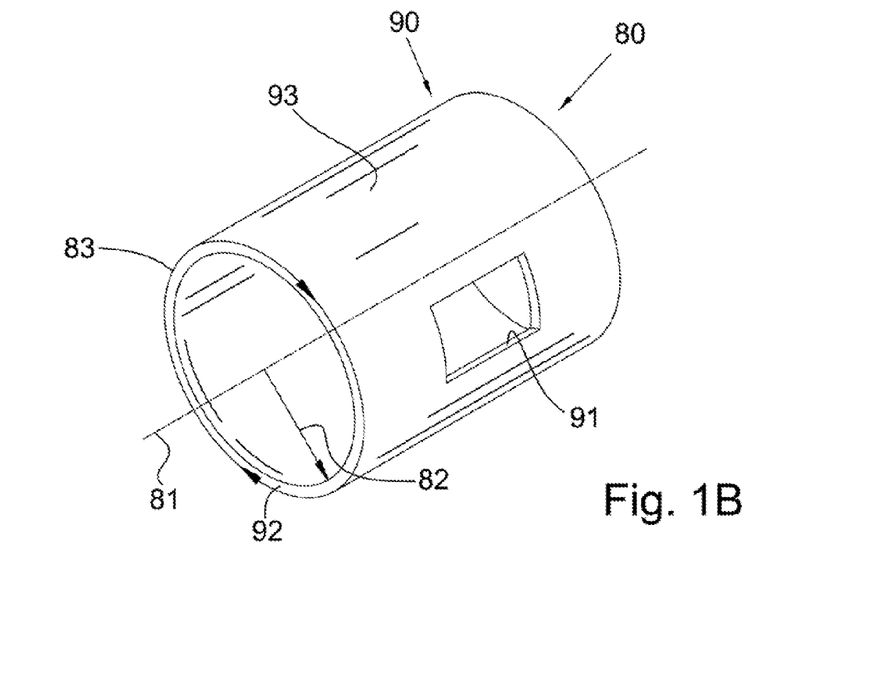
FIG. 1B is a perspective view of an object in the cylindrical coordinate system of FIG. 1A demonstrating spatial terminology used in the present application; and, FIG. 2 is a partial cross-sectional view of a torque converter with a turbine plate assembly.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
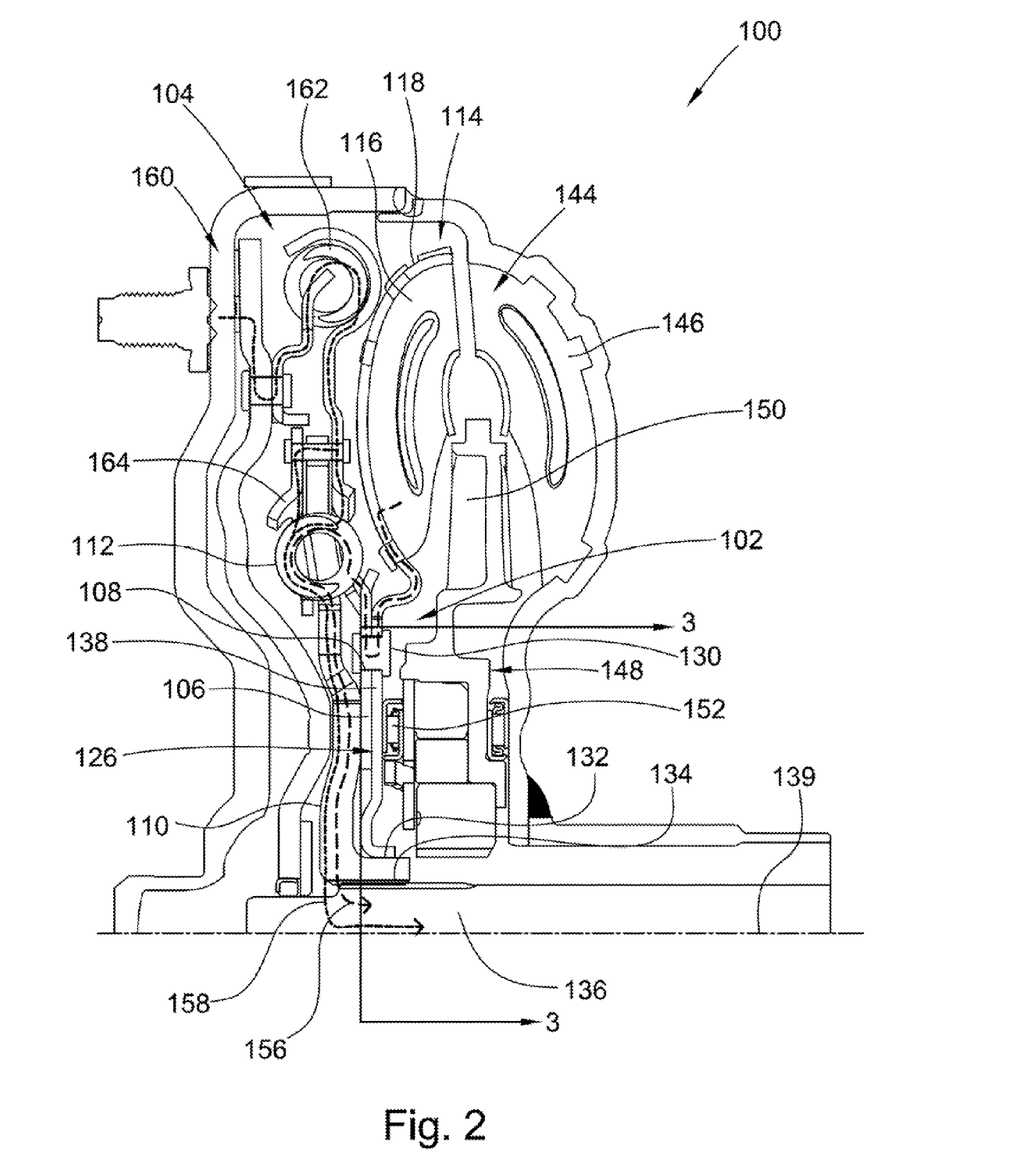

FIG. 2 is a partial cross-sectional view of torque converter 100 with turbine plate assembly 102.

Figure 3:
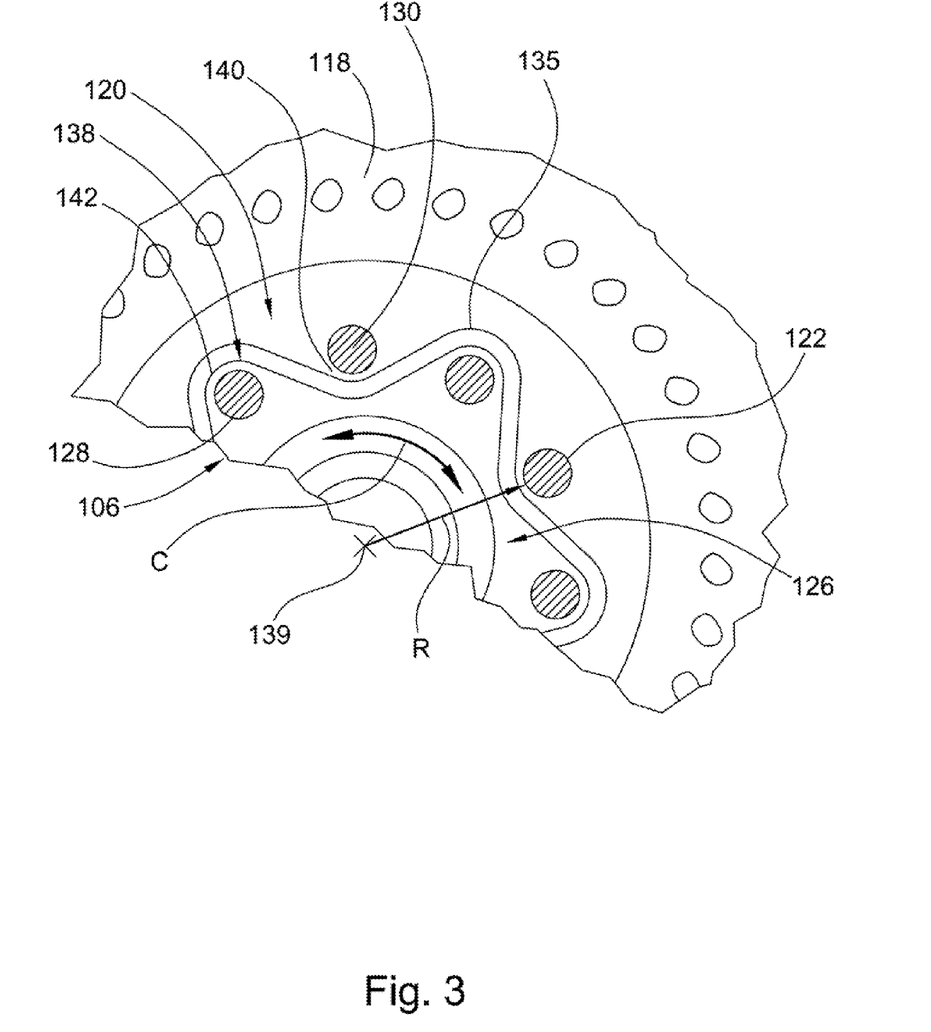
FIG. 3 is a front view generally along line 3-3 in FIG. 2.

FIG. 3 is a front view generally along line 3-3 in FIG. 2. The following should be viewed in light of FIGS. 2 and 3. Torque converter 100 includes damper assembly 104 including cover plate 106 with a plurality of openings 108, flange 110, and at least one spring 112 in contact with the flange and the cover plate. The torque converter also includes turbine 114 including at least one blade 116 and shell 118 including portion 120 disposed radially inward of blade 116. Portion 120 also includes a plurality of openings 122. Turbine plate assembly 102 includes turbine plate 126 with a plurality of openings 128, and a plurality of fasteners 130 passing through the openings 108, 122, and 128. Fasteners 130 fixedly secure cover plate 106, portion 120, and the turbine plate to one another.

In an example embodiment, radially inner circumference 132 of the turbine plate is in contact with the flange to radially center the turbine with respect to the flange. In an example embodiment, radially inner circumference 134 of the flange is arranged to contact input shaft 136 for a transmission (not shown) to radially center the flange with respect to the input shaft and to transmit torque to the input shaft as further described below.

In an example embodiment, radially inner circumference 135 of portion 120 of the turbine shell and radially outer circumference 138 of the turbine plate are aligned in a radial direction, advantageously minimizing an axial extent of the turbine plate assembly. In an example embodiment, openings 122 and 128 are at least partially aligned in a circumferential direction such that fasteners 130 are at a uniform radial distance R from axis of rotation 139 for the torque converter. Having fasteners 130 at a single radius reduces the radial space requirements for assembly 102. For example, if respective fasteners for the turbine plate and portion 120 were at different radii, greater radial space would be needed to accommodate the two rings of fasteners. In an example embodiment, portion 120 includes a plurality of radially inwardly projecting protrusions 140 and the turbine plate includes a plurality of radially outwardly projecting protrusions 142. Protrusions 140 and 142 are interleaved. By interleaved, we mean that protrusions 140 and 142 are at least partially aligned in circumferential direction C and protrusions 140 and 142 alternate in direction C.

In an example embodiment, torque converter 100 includes impeller 144 with at least one blade 146, stator 148 with at least one blade 150, and bearing 152. The stator is axially disposed between the turbine and the impeller, and the bearing is axially disposed between the turbine plate and the stator and in contact with the turbine plate and the stator to enable relative rotation of the turbine shell with respect to the stator. In an example embodiment, bearing 152 is a thrust bearing and axial force associated with axial displacement of the damper assembly or the turbine toward each other is transmitted to the bearing. The most radially inward segment of the portion of the turbine shell is radially outward of the bearing.

Advantageously, the configuration shown for torque converter 100 eliminates the need for a separate turbine hub to center the turbine and the damper assembly and to connect the turbine and the damper assembly to an input shaft. Eliminating the hub reduces the cost, size, weight, and complexity of the torque converter. For example, torque path 156 (for operation in torque converter mode) extends from the turbine to the input shaft via portion 120, fasteners 130, cover plate 106, spring 112, and the flange. In lock-up mode, torque path 158 extends from lock-up clutch 160 to the input shaft via at least one spring 162, cover plates 106 and 164, spring 112, and the flange.

Figure 4:
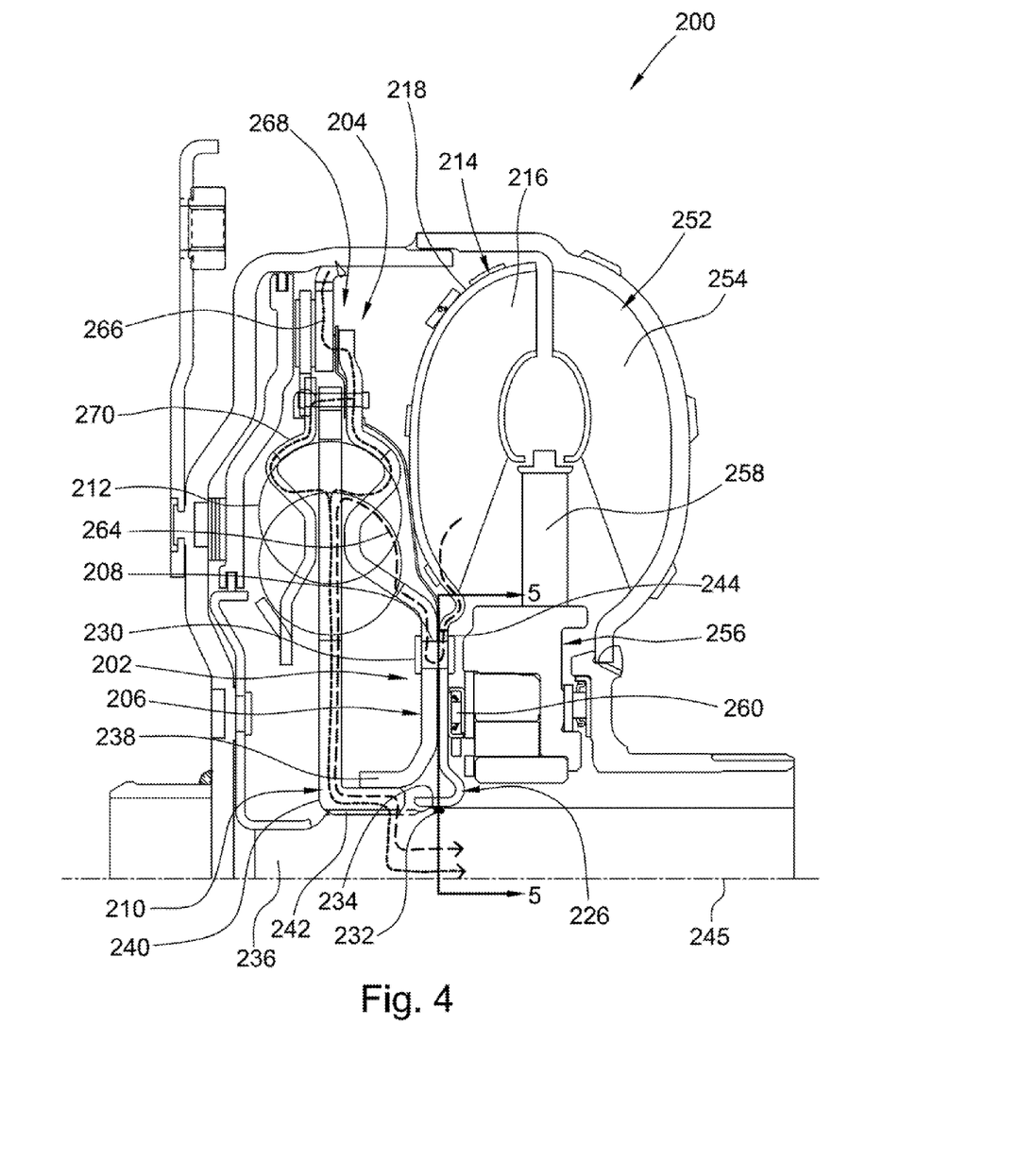
FIG. 4 is a partial cross-sectional view of a torque converter with a turbine plate assembly.

FIG. 4 is a partial cross-sectional view of torque converter 200 with turbine plate assembly 202. Torque converter 200 includes damper assembly 204 including cover plate 206 with a plurality of openings 208, flange 210, and at least one spring 212 in contact with the flange and the cover plate. The torque converter also includes turbine 214 including at least one blade 216 and shell 218 including portion 220 disposed radially inward of blade 216. Portion 220 also includes a plurality of openings 222. Turbine plate assembly 202 includes turbine plate 226 with a plurality of openings 228, and a plurality of fasteners 230 passing through the openings 208, 222, and 228. Fasteners 230 fixedly secure cover plate 206, portion 220, and turbine plate 226 to one another.

Assembly 224 includes seal element 232 sealed against radially inner circumference 234 of turbine plate 226 and arranged to seal against input shaft 236 for a transmission (not shown). Radially inner circumference 238 of cover plate 206 is in contact with portion 240 of flange 210 and radially inner circumference 242 of the flange is arranged to contact input shaft 236 to radially center the flange and cover plate 206 with respect to the input shaft and to transmit torque to the input shaft as further described below.

Figure 5:
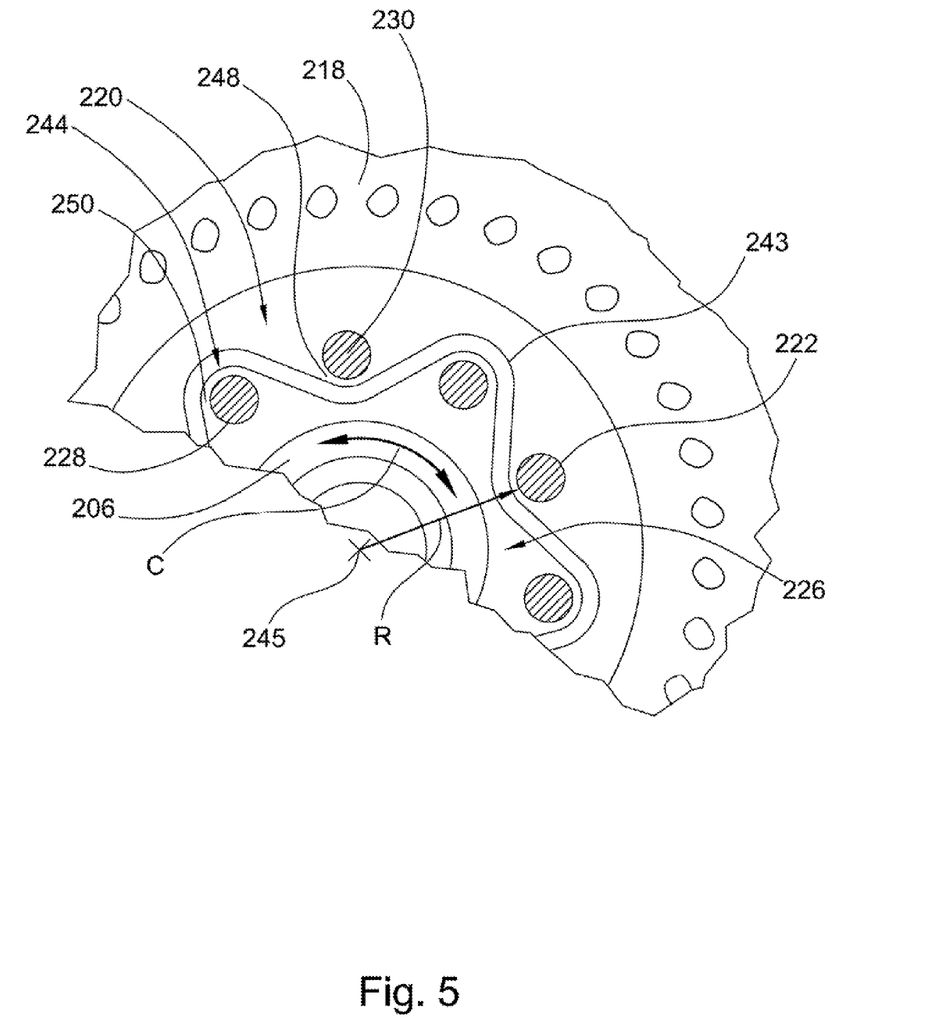
FIG. 5 is a front view generally along line 5-5 in FIG. 4.

In an example embodiment, radially inner circumference 243 of portion 220 of the turbine shell and radially outer circumference 244 of the turbine plate are aligned in a radial direction, advantageously minimizing an axial extent of the turbine plate assembly. In an example embodiment, openings 222 and 228 are at least partially aligned in circumferential direction C such that fasteners 230 are at a uniform radial distance R from axis of rotation 245 for the torque converter. In an example embodiment, portion 220 includes a plurality of radially inwardly projecting protrusions 248 and the turbine plate includes a plurality of radially outwardly projecting protrusions 250. Protrusions 248 and 250 are interleaved. By interleaved, we mean that protrusions 248 and 250 are at least partially aligned in circumferential direction C and protrusions 248 and 250 alternate in direction C.

In an example embodiment, torque converter 200 includes impeller 252 with at least one blade 254, stator 256 with at least one blade 258, and bearing 260. The stator is connected to the turbine and the impeller, and the bearing is axially disposed between the turbine plate and the stator and in contact with the turbine plate and the stator to enable relative rotation of the turbine shell with respect to the stator. In an example embodiment, bearing 260 is a thrust bearing and axial force associated with axial displacement of the damper assembly or the turbine toward each other is transmitted to the bearing.

Advantageously, the configuration shown for torque converter 200 eliminates the need for a separate turbine hub to provide a seal, to center the turbine and the damper assembly, and to connect the turbine and the damper assembly to an input shaft. Eliminating the hub reduces the cost, size, weight, and complexity of the torque converter. For example, torque path 264 (for operation in torque converter mode) extends from the turbine to the input shaft via portion 220, fasteners 230, cover plate 206, spring 212, and the flange. In lock-up mode, torque path 266 extends from lock-up clutch 268 to the input shaft via plates 206 and 270, spring 212, and flange 210.

Figure 6:
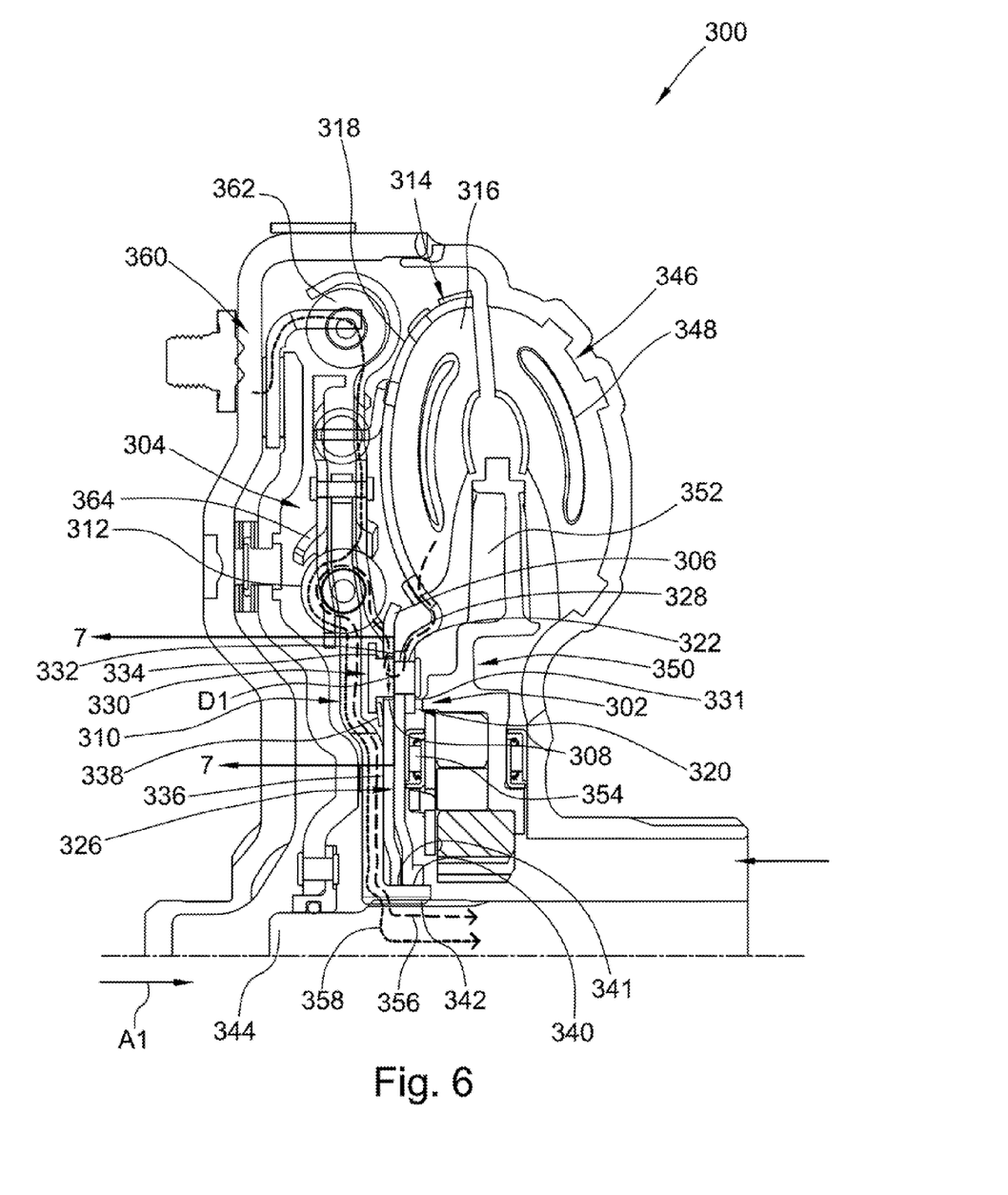
FIG. 6 is a partial cross-sectional view of a torque converter with a turbine plate assembly.

FIG. 6 is a partial cross-sectional view of torque converter 300 with turbine plate assembly 302.

Figure 7:
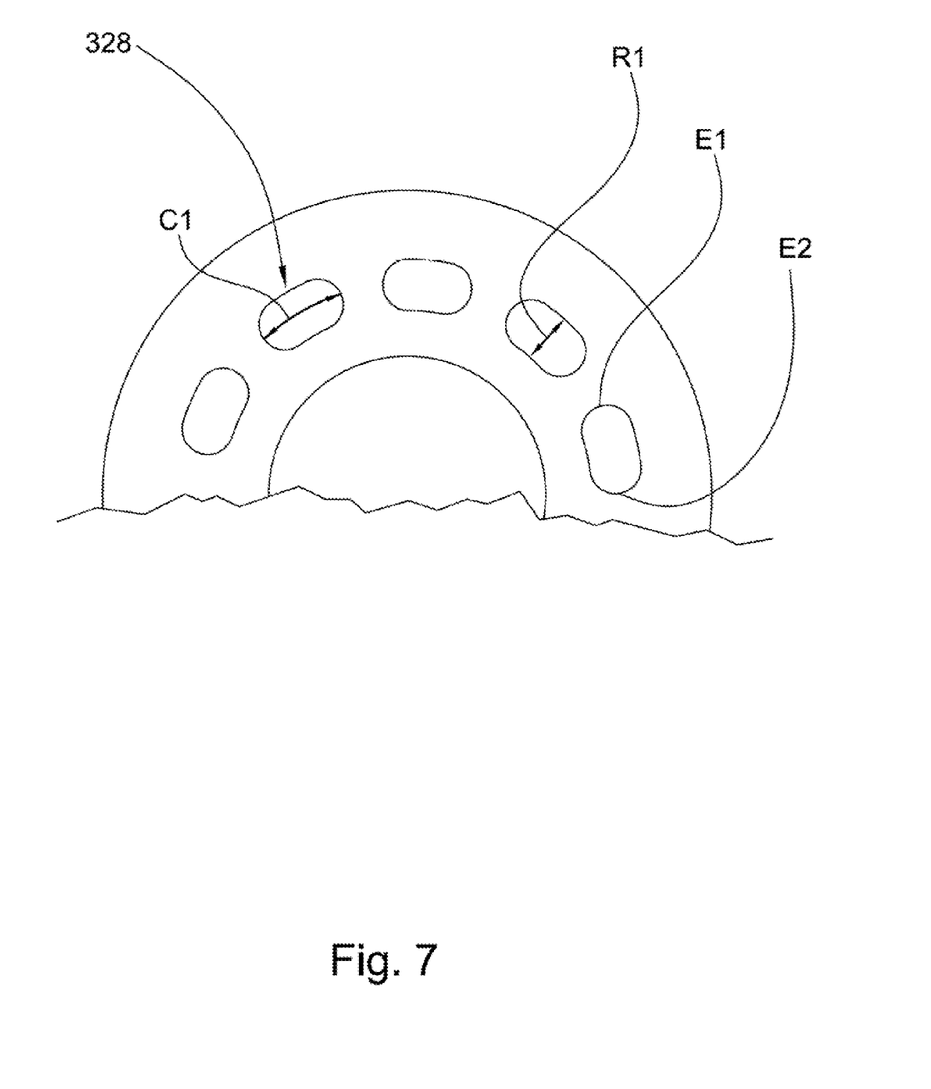
FIG. 7 is a back view generally along line 7-7 in FIG. 6.

FIG. 7 is a back view generally along line 7-7 in FIG. 6. The following should be viewed in light of FIGS. 6 and 7. Torque converter 300 includes damper assembly 304 including cover plate 306 with a plurality of openings 308, flange 310, and at least one spring 312 in contact with the flange and the cover plate. The torque converter also includes turbine 314 including at least one blade 316 and shell 318 including portion 320 disposed radially inward of blade 316. Portion 320 also includes a plurality of openings 322. Turbine plate assembly 302 includes turbine plate 326 with a plurality of openings 328, and a plurality of fasteners 330 passing through the openings 308, 322, and 328.

Segment 331 of portion 320 and segment 332 of turbine plate 326 are aligned in axial direction A1. Fasteners 330 fixedly secure portion 320 and turbine plate 326 to one another and restrict rotation of cover plate 306 with respect to portion 320 and turbine plate 326. To enable the fixing of plate 306 and portion 320, portion 334 of fasteners 330, passing through the cover plate, is engaged with radial surface 336 of plate 306. Portion 334 has a diameter D1 and each opening 328 is in the form of a circumferentially curved slot with radial extent R1 greater than D1 and circumferential extent C1 greater than D1. Thus, fasteners 330 have a limited degree of circumferential motion within openings 328 and with respect to turbine plate 326 and the turbine. Specifically, rotation of fasteners 330, and turbine plate 326 and the turbine, is limited by contact of the fasteners with ends E1 and E2 of openings 328. Assembly 324 also includes resilient element 338 which urges cover plate 306 in axial direction A1 against turbine plate 326, creating frictional contact, or hysteresis between cover plate 306 and turbine plate 326, which is beneficial to the operation of damper assembly 304. For example, the hysteresis can be used to tune the damper assembly to attenuate undesirable vibration.

In an example embodiment, radially inner circumferences 340 and 341 of the turbine plate and cover plate 306, respectively, are in contact with flange 310 to radially center turbine 314 and cover plate 306 with respect to the flange. In an example embodiment, radially inner circumference 342 of the flange is arranged to contact input shaft 344 for a transmission (not shown) to radially center the flange with respect to the input shaft and to transmit torque to the input shaft as further described below.

In an example embodiment, torque converter 300 includes impeller 346 with at least one blade 348, stator 350 with at least one blade 352, and bearing 354. The stator is connected to the turbine and the impeller, and the bearing is axially disposed between the turbine plate and the stator and in contact with the turbine plate and the stator to enable relative rotation of the turbine shell with respect to the stator. In an example embodiment, bearing 354 is a thrust bearing and axial force associated with axial displacement of the damper assembly or the turbine toward each other is transmitted to the bearing.

Advantageously, the configuration shown for torque converter 300 eliminates the need for a separate turbine hub to center the turbine and the damper assembly and to connect the turbine and the damper assembly to an input shaft. At the same time assembly 302 provides the desired frictional and rotational contact between cover plate 306 and turbine plate 326. Eliminating the hub reduces the cost, size, weight, and complexity of the torque converter. For example, torque path 356 (for operation in torque converter mode) extends from the turbine to the input shaft via portion 320, fasteners 330, cover plate 306, spring 312, and the flange. In lock-up mode, torque path 358 extends from lock-up clutch 360 to the input shaft via at least one spring 362, cover plates 106 and 364, spring 112, and the flange.

The following should be viewed in light of FIGS. 2 through 7. Advantageously, when turbine shell 118, 218, or 318 is formed by a stamping process, the respective turbine plate can be formed from the portion of the blank for the turbine shell left over from the stamping process, reducing cost for the turbine plate. Since a separate stamping operation with its attendant costs and complexities is not required, using the left over portion even further reduces costs and complexity for the turbine plate.

Advantageously, the turbine shell and the turbine plate shown in the figures can be subjected to differing fabrication processes once the pieces are formed by stamping. For example, it is usually not necessary to harden the turbine shell because of the added "rib" strength from the plurality of blades. Furthermore, if hardened, the shell would likely lose much of the strength gained during exposure to the elevated temperatures necessary to braze the blades. On the other hand, the turbine plate acts as a receiving surface for a thrust bearing and it is desirable to harden the turbine plate, for example, by heat treating, so that the turbine plate has better wearing properties. If the receiving surface for the bearing and the turbine shell are formed of a single piece, the wearing properties of the plate would be sacrificed during the turbine manufacturing process. Further, if a receiving surface for a thrust bearing is integral to the shell, characteristics of the receiving surface can be undesirably modified by the brazing oven, for example, the receiving surface can be distorted. Advantageously, by the use of a separate turbine plate, the turbine plate can be withheld from the brazing oven when the turbine is formed.

Although torque converters 100, 200, and 300, and assemblies 102, 202, and 302 have been shown with respective particular configurations of components, it should be understood that torque converters 100, 200, and 300, and assemblies 102, 202, and 302 are not limited to the respective particular configuration of components shown and that other respective configurations of components are possible.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. An assembly for a torque converter, comprising:
   a damper assembly including a cover plate including a first plurality of openings, a flange, and at least one spring in contact with the flange and the cover plate;
   a turbine including at least one first blade and a shell including a portion disposed radially inward of the at least one blade, and a second plurality of openings in the portion;
   a turbine plate with a third plurality of openings; and,
   a plurality of fasteners passing through the first, second, and third pluralities of openings and:
      fixedly securing the cover plate, the portion of the turbine shell, and the turbine plate to one another; or,
      fixedly securing the portion of the turbine shell to the turbine plate and restricting rotation of the cover plate with respect to the portion of the turbine shell to the turbine plate, wherein the turbine plate is hardened by heat treatment and the turbine shell is not hardened by heat treatment.

2. The assembly of claim 1 wherein a radially inner circumference of the turbine plate is in contact with the flange to radially center the turbine with respect to the flange.

3. The assembly of claim 2 wherein a radially inner circumference of the flange is arranged to contact an input shaft for a transmission to radially center the flange with respect to the input shaft.

4. The assembly of claim 1 wherein torque from the turbine is transmitted from the portion of the turbine shell to the cover plate through the plurality of fasteners and from the cover plate to the flange of the damper through the at least one spring.

5. The assembly of claim 4 wherein the flange is arranged to engage an input shaft for a transmission to transmit the torque to the input shaft.

6. The assembly of claim 1 wherein the turbine plate is arranged to seal against an input shaft for a transmission.

7. The assembly of claim 1 wherein:
   the torque converter includes an impeller with at least one second blade, a stator with at least one third blade, and a bearing;
   the stator is axially disposed between the turbine and the impeller; and,
   the bearing is axially disposed between the turbine plate and the stator and in contact with the turbine plate and the stator to enable relative rotation of the turbine shell with respect to the stator.

8. The assembly of claim 7 wherein axial force associated with axial displacement of the damper assembly or the turbine toward each other is transmitted to the bearing.

9. The assembly of claim 7 wherein a most radially inward segment of the portion of the turbine shell is radially outward of the bearing.

10. The assembly of claim 1 wherein an inner circumference of the portion of the turbine shell and an outer circumference of the turbine plate are aligned in a radial direction.

11. The assembly of claim 1 wherein the second and third pluralities of openings are at least partially aligned in a circumferential direction.

12. The assembly of claim 1 wherein at least respective segments of the portion of the turbine shell and the turbine plate are aligned in an axial direction.

13. The assembly of claim 1 wherein:
   for each fastener in the plurality of fasteners, a first portion of said each fastener passing through the cover plate has a first diameter; and,
   each opening in the first plurality of openings has a radial extent and a circumferential extent each greater than the diameter such that relative rotation of the cover plate and the plurality of fasteners is enabled.

14. The assembly of claim 13 wherein the first portion of said each fastener is in contact with a radial surface for the turbine plate.

15. The assembly of claim 13 further comprising a resilient element in contact with the plurality of fasteners and the cover plate and urging the cover plate toward the turbine plate.

16. The assembly of claim 1 wherein:
   the portion of the turbine shell includes a plurality of radially inwardly projecting protrusions; and,
   the turbine plate includes a plurality of radially outwardly projecting protrusions interleaved with the plurality of radially inwardly projecting protrusions and at least partially aligned in a circumferential direction with the plurality of radially inwardly projecting protrusions.

17. A torque converter, comprising:
   a turbine including at least one first blade and a shell including a portion disposed radially inward of the at least one blade, and a first plurality of openings in the portion;
   an impeller with at least one second blade;
   a stator with at least one third blade, the stator axially disposed between the turbine and the impeller;
   a damper assembly including a cover plate including a second plurality of openings, a flange, and at least one spring in contact with the flange and the cover plate;
   a turbine plate assembly including:
      a turbine plate with a third plurality of openings;
      a plurality of fasteners passing through the first, second, and third pluralities of openings and fixedly securing the portion of the turbine shell to the turbine plate; and,
      a radially inner circumference of the turbine plate is in contact with the flange to radially center the turbine with respect to the flange;
      torque from the turbine is transmitted from the portion of the turbine shell to the cover plate through the plurality of fasteners and from the cover plate to the flange of the damper through the at least one spring;

the portion of the turbine shell and a radially outward portion of the turbine plate are aligned in an axial direction;

for each fastener in the plurality of fasteners, a first portion of said each fastener passing through the cover plate has a first diameter; and, each opening in the first plurality of openings has a radial extent and a circumferential extent each greater than the diameter such that relative rotation of the cover plate and the plurality of fasteners is enabled.

18. A torque converter, comprising:

a turbine including at least one first blade and a shell including a portion disposed radially inward of the at least one blade, and a first plurality of openings in the portion;

an impeller with at least one second blade;

a stator with at least one third blade, the stator connected to the turbine and the impeller;

a damper assembly including a cover plate including a second plurality of openings, a flange, and at least one spring in contact with the flange and the cover plate;

a turbine plate assembly including:
   a turbine plate with a third plurality of openings; and,
   a plurality of fasteners passing through the first, second, and third pluralities of openings and fixedly securing the portion of the turbine shell to the turbine plate, wherein:

torque from the turbine is transmitted from the portion of the turbine shell through the turbine plate to the cover plate through the plurality of fasteners and from the cover plate to the flange of the damper through the at least one spring; and the portion of the turbine shell and a radially outward portion of the turbine plate are aligned in a radial direction, wherein:
   a radially inner circumference of the turbine plate is in contact with the flange to radially center the turbine with respect to the flange; or,
   the turbine plate assembly is arranged to seal against an input shaft for a transmission.

\* \* \* \* \*